United States Patent
Auerbach et al.

(10) Patent No.: US 10,703,950 B2
(45) Date of Patent: Jul. 7, 2020

(54) PHASE CHANGE MATERIALS AND METHODS OF REGULATING TEMPERATURE

(71) Applicant: Croda International PLC, Yorkshire (GB)

(72) Inventors: Marco Auerbach, Zoetermeer (NL); Ron Van Aken, Nieuwerkerk aan den IJseel (NL)

(73) Assignee: Croda International Plc (GB)

( * ) Notice: Subject to any disclaimer, the term of this patent is extended or adjusted under 35 U.S.C. 154(b) by 96 days.

(21) Appl. No.: 15/752,942

(22) PCT Filed: Aug. 17, 2016

(86) PCT No.: PCT/GB2016/052537
§ 371 (c)(1),
(2) Date: Feb. 15, 2018

(87) PCT Pub. No.: WO2017/042530
PCT Pub. Date: Mar. 16, 2017

(65) Prior Publication Data
US 2018/0244971 A1    Aug. 30, 2018

(30) Foreign Application Priority Data
Sep. 8, 2015    (GB) .................................. 1515893.4

(51) Int. Cl.
C09K 5/00    (2006.01)
C09K 5/06    (2006.01)
C09K 5/02    (2006.01)

(52) U.S. Cl.
CPC .............. C09K 5/063 (2013.01); *C09K 5/02* (2013.01); *C09K 5/06* (2013.01)

(58) Field of Classification Search
CPC ... C09K 5/00; C09K 5/02; C09K 5/06; C09K 5/063
USPC ........................................................ 252/73
See application file for complete search history.

(56) References Cited

U.S. PATENT DOCUMENTS

| | | | | |
|---|---|---|---|---|
| 3,178,386 | A * | 4/1965 | Hickam | C08K 5/101 524/315 |
| 4,971,713 | A † | 11/1990 | Ames | |
| 5,204,105 | A | 4/1993 | Mausner | |
| 6,617,289 | B2 † | 9/2003 | Memita | |
| 2007/0000484 | A1 * | 1/2007 | Magill | C09K 5/063 126/263.02 |
| 2009/0227451 | A1 | 9/2009 | Rose et al. | |

FOREIGN PATENT DOCUMENTS

| WO | 2011099871 A1 | 8/2011 |
|---|---|---|
| WO | 2014151947 A1 | 9/2014 |

OTHER PUBLICATIONS

Hoback et al. "Some Esters of Normal Aliphatic Alcohols and Acids", Am. Chem. Soc., vol. 65, 1943, p. 1606-1607. Mar. 1, 1943 (Year: 1943).*
Aydin et al., "High-chain fatty acid esters of 1-hexadecanol for low temperature thermal energy storage with phase change materials", Sep. 8, 2011, pp. 93-100, vol. 96(1), Solar Energy Materials & Solar Cells, Elsevier Science Publishers, Amsterdam, NL.
Aydin et al., "High-chain fatty acid esters of myristyl alcohol with even carbon number: Novel organic phase change materials for thermal energy storage 1", Apr. 13, 2011, pp. 2752-2762, vol. 95(10), Solar Energy Materials & Solar Cells, Elsevier Science Publishers, Amsterdam, NL.
Feldman et al., "Low chain esters of stearic acid as phase change materials for thermal energy storage in buildings", Mar. 1, 1995, pp. 311-322, vol. 36(3), Solar Energy Materials & Solar Cells, Elsevier Science Publishers, Amsterdam, NL.
Aydin et al., "High-chain fatty acid esters of myristyl alcohol with odd carbon number: Novel organic phase change materials for thermal energy storage 2", Solar Energy Materials and Solar Cells, vol. 95, No. 8, Apr. 13, 2011, pp. 2417-2423.
International Search Report and Written Opinion for International Application No. PCT/GB2016/052537, dated Nov. 9, 2016, 12 pages.
Aydin, Ahmet Alper, The Synthesis and Thermal Properties of Novel Organic Phase Change Materials, Jul. 2010, Istanbul Technical University, ITU Academic Open Archive, URL https://polen.itu.edu.tr/bitstream/11527/6423/1/11021.pdf.†

* cited by examiner
† cited by third party

Primary Examiner — Jane L Stanley
(74) Attorney, Agent, or Firm — RatnerPrestia

(57) ABSTRACT

The present invention provides a phase change material composition comprising an ester of a linear alcohol which has at least 4 carbon atoms and a linear carboxylic acid which has at least 4 carbon atoms, wherein the total number of carbon atoms in the ester is in the range from 13 to 31. The invention also provides products including the phase change material composition and methods of regulating temperature.

21 Claims, No Drawings

PHASE CHANGE MATERIALS AND METHODS OF REGULATING TEMPERATURE

CROSS REFERENCE TO RELATED APPLICATIONS

This application is the National Stage filing of International Appln. No. PCT/GB2016/052537, filed Aug. 17, 2016, and claims priority of GB Application No. 1515893.4, filed Sep. 8, 2015, the entirety of which applications is incorporated herein by reference for all purposes.

FIELD OF THE INVENTION

The present invention relates to a phase change material (PCM) composition, a method of regulating temperature, a PCM product, a PCM particle and the use of an ester as a PCM.

BACKGROUND

Phase change materials (PCMs) are a class of material which may be used as latent heat storage media, heat transfer media and/or temperature regulating media. PCMs find many applications; for example, as heat storage media in insulating materials or building materials or as heat transfer media in heating and cooling (e.g. refrigeration) systems, or as temperature regulating media in packaging or clothing. The way in which PCMs operate is based on the enthalpy of transformation accompanying transition from the solid to the liquid phase or vice versa, which results in energy being absorbed from or released to their surroundings. They can therefore be used firstly for maintaining a constant temperature within a defined range and secondly, in a suitable arrangement, for improving heat insulation.

One application of PCMs is in the building and construction industry, offering the possibility to reduce the use of heating and air conditioning, and to maintain a comfortable temperature in light-weight buildings with low thermal mass. Other applications include the capture of low-grade process heat, storage of solar energy, and temperature regulation of heat sensitive material including living organisms such as people and animals, transplant organs and delicate electronics.

Since one phase of a PCM is a liquid phase and another phase is solid, PCMs require careful storage and containment during their use to avoid leakage. A need remains to improve one or more properties of a phase change material to improve its performance or ease of containment.

SUMMARY OF THE INVENTION

The present invention is based in part on the recognition by the applicant that the vapour pressure or volatility of a PCM may be a significant factor in the performance of the PCM. For example, a PCM with a lower vapour pressure will have a lower tendency to evaporate. Evaporation of a PCM may be undesirable due to the creation of unwanted odour from the PCM vapour or the potential for leakage of the PCM from its container (e.g. pouch, panel or capsule) during use. The rate of evaporation of a PCM (which is indicative of its vapour pressure) can be measured by monitoring the weight loss of the PCM over time at a set temperature using thermo-gravimetric analysis (TGA).

The applicant has noted that the evaporation rate of an ester of a linear alcohol and a linear carboxylic acid is inversely proportional to the total number of carbon atoms in the ester. Fewer carbon atoms in total results in a higher rate of evaporation and vice versa. However, the applicant has found that the melting point of the ester, while following the general trend of increasing melting point with increasing total carbon atoms, is not linear. The applicant has recognised that the position of the ester bond within the ester has a greater effect on the melting point of the ester than on the evaporation rate of the ester. An ester bond towards an end of the ester (e.g. when using methanol, ethanol, methanoic acid or ethanoic acid in the ester) results in a higher melting point than an ester bond in the middle region of the ester. Without being bound by theory, it is believed that the use in a PCM composition of an ester of a linear alcohol which has at least 4 carbon atoms and a linear carboxylic acid which has at least 4 carbon atoms is advantageous since it reduces the tendency of the ester to evaporate when compared with a comparative ester with a similar melting point which comprises an acid or alcohol having fewer than 4 carbon atoms. This is because the comparative ester will have fewer carbon atoms in total (and therefore a higher rate of evaporation) due to the effect of the ester bond being towards an end of the comparative ester and thus raising its melting point.

Viewed from a first aspect, the present invention provides a phase change material composition comprising an ester of a linear alcohol which has at least 4 carbon atoms and a linear carboxylic acid which has at least 4 carbon atoms, wherein the total number of carbon atoms in the ester is in the range from 13 to 31.

Viewed from a second aspect, the present invention provides a method of regulating temperature in an environment comprising the steps of: providing in the environment an amount of a phase change material composition comprising an ester of a linear alcohol which has at least 4 carbon atoms and a linear carboxylic acid which has at least 4 carbon atoms, wherein the total number of carbon atoms in the ester is in the range from 13 to 31; and storing or releasing thermal energy in the phase change material composition by transfer of thermal energy between the environment and the phase change material composition, such that the temperature of the environment is regulated over a period of time.

Viewed from a third aspect, the present invention provides the use of an ester of a linear alcohol which has at least 4 carbon atoms and a linear carboxylic acid which has at least 4 carbon atoms, wherein the total number of carbon atoms in the ester is in the range from 13 to 31 as a phase change material in a textile product, foam product, medical product, electronic product, refrigeration system, heating, ventilation and air-conditioning (HVAC) system, packaging material or construction material.

Any aspect of the invention may include any of the features described herein with regard to that aspect of the invention or any other aspects of the invention.

DETAILED DESCRIPTION OF THE INVENTION

It will be understood that any upper or lower quantity or range limit used herein may be independently combined.

It will be understood that, when describing the number of carbon atoms in a substituent group (e.g. 'C1 to C6'), the number refers to the total number of carbon atoms present in the substituent group, including any present in any branched groups. Additionally, when describing the number of carbon atoms in, for example fatty acids, this refers to the total number of carbon atoms including the one at the carboxylic acid, and any present in any branch groups.

Many of the chemicals which may be used to produce the present invention are obtained from natural sources. Such chemicals typically include a mixture of chemical species due to their natural origin. Due to the presence of such mixtures, various parameters defined herein can be an average value and may be non-integral.

Compounds may be referred to herein by their systematic names (e.g. nonanoic acid) or by their equivalent trivial or common names (e.g. pelargonic acid) interchangeably and no significance should be given to whether a systematic name or a trivial or common name is used.

Ester

The ester is an ester of a linear alcohol which has at least 4 carbon atoms and a linear carboxylic acid which has at least 4 carbon atoms, wherein the total number of carbon atoms in the ester is in the range from 13 to 31:

The total number of carbon atoms in the ester may be at least 15, preferably at least 17, more preferably at least 19. The total number of carbon atoms in the ester may be at most 29, preferably at most 27, more preferably at most 25, particularly preferably at most 23. The total number of carbon atoms in the ester is preferably from 15 to 31, more preferably from 15 to 27, yet more preferably from 17 to 25. The total number of carbon atoms in the ester may be an odd number. An odd total number of carbon atoms may be advantageous because an ester with an equal number of carbon atoms in the alcohol and the acid (and therefore an even number of carbon atoms in total) may have a higher melting point than otherwise. Without being bound by theory, it is believed this may be due to the symmetry of an ester with an equal number of carbon atoms in the alcohol and the acid.

Preferably the alcohol and the acid have a different number of carbon atoms. This may be advantageous because an ester with an equal number of carbon atoms in the alcohol and the acid may have a higher melting point than an ester with the same total number of carbon atoms but different numbers in the alcohol and acid. The difference between the number of carbon atoms in the alcohol and the number of carbon atoms in the acid may be at least 1, preferably at least 2, more preferably at least 3. The difference between the number of carbon atoms in the alcohol and the number of carbon atoms in the acid may be at most 13, preferably at most 11, more preferably at most 9, yet more preferably at most 7.

Preferably the ester comprises decyl nonanoate (also known as decyl pelargonate), lauryl nonanoate or cetyl nonanoate, more preferably the ester comprises lauryl nonanoate.

The phase change material composition may comprise at least 75 wt % of the ester, preferably at least 80 wt %, more preferably at least 85 wt %, more preferably at least 90 wt %, particularly preferably at least 95 wt %. The phase change material composition may comprise at most 99.99 wt % of the ester, preferably at most 99.9 wt %, more preferably at most 99 wt %, yet more preferably at most 95 wt %.

The ester may have a melting point of at least $-10°$ C., preferably at least $-5°$ C., more preferably at least $0°$ C., particularly preferably at least $5°$ C. The ester may have a melting point of at most $50°$ C., preferably at most $40°$ C., more preferably at most $30°$ C., yet more preferably at most $25°$ C., particularly preferably at most $20°$ C. Preferably, the ester has a melting point in the range from $-10°$ C. to $50°$ C., more preferably from $5°$ C. to $25°$ C. The melting point may be measurable by Differential Scanning calorimetry (DSC). The DSC method may be as described herein.

The ester may have a melting point which is at least $2°$ C. lower, preferably at least $4°$ C. lower, more preferably at least $6°$ C. lower, yet more preferably at least $8°$ C. lower than a comparative ester with the same total number of carbon atoms wherein the comparative ester is a methyl or ethyl ester of a linear carboxylic acid.

The ester may have a latent heat of fusion (i.e. the latent heat of the transition from solid to liquid) of at least 100 J/g, preferably at least 150 J/g, more preferably at least 160 J/g, yet more preferably at least 170 J/g. The PCM composition may have a latent heat of fusion of at most 300 J/g, preferably at most 250 J/g, more preferably at most 230 J/g, yet more preferably at most 210 J/g. The PCM composition may have a latent heat of fusion in the range from 100 to 250 J/g, preferably in the range from 170 to 210 J/g. The latent heat of fusion may be measurable by DSC.

The volatility and/or vapour pressure of the ester may be indicated by the weight loss of a sample which is heated at a constant temperature over a period of time. The weight loss may be measurable by Thermo-Gravimetric Analysis (TGA). The TGA method may be as described herein. The sample may be placed under nitrogen during the measurement. The ester may have a weight loss after heating at $40°$ C. for 6 hours of less than 0.8 wt %, preferably less than 0.5 wt %, more preferably less than 0.2 wt %, yet more preferably less than 0.1 wt %, particularly preferably less than 0.05 wt %. The ester may have a weight loss after heating at $40°$ C. for 6 hours of at least 0.01 wt %.

The ester may have a weight loss after heating at $40°$ C. for 12 hours of less than 1 wt %, preferably less than 0.8 wt %, more preferably less than 0.5 wt %, yet more preferably less than 0.2 wt %, particularly preferably less than 0.1 wt %. The ester may have a weight loss after heating at $40°$ C. for 12 hours of at least 0.01 wt %.

Linear Alcohol

The linear alcohol has at least 4 carbon atoms. The alcohol may have at least 5 carbon atoms, preferably at least 6, more preferably at least 7, yet more preferably at least 8, particularly preferably at least 10. The alcohol may have at most 22 carbon atoms, preferably at most 20, more preferably at most 18, yet more preferably at most 16, particularly preferably at most 14. Preferably the alcohol has from 6 to 22 carbon atoms, more preferably from 8 to 20, yet more preferably from 10 to 18.

The linear alcohol may be a fatty alcohol. The linear alcohol may be selected from butyl alcohol, pentyl alcohol, hexyl alcohol, heptyl alcohol, octyl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, nonadecyl alcohol, arachidyl alcohol, heneicosyl alcohol, behenyl alcohol and mixtures thereof, preferably the linear alcohol is selected from decyl alcohol, lauryl alcohol, myristyl alcohol, cetyl alcohol and mixtures thereof, particularly selected from lauryl alcohol, myristyl alcohol and mixtures thereof, more preferably the linear alcohol is lauryl alcohol.

Linear Carboxylic Acid

The linear carboxylic acid has at least 4 carbon atoms. The acid may have at least 5 carbon atoms, preferably at least 6, more preferably at least 7. The acid may have at most 15 carbon atoms, preferably at most 13, more preferably at most 11, particularly preferably at most 9. Preferably the acid has from 5 to 11 carbon atoms, more preferably from 7 to 9.

The linear acid may be a fatty acid. The linear acid may be selected from butyric acid, pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid and mixtures thereof, preferably the linear acid is selected from heptanoic acid, nonanoic acid and mixtures thereof, more preferably the acid is nonanoic acid.

PCM Composition

The phase change material composition may comprise a further component selected from a nucleating agent, a thermal stabiliser, an anti-oxidant, a fire retardant, a structuring agent, a fatty acid, a fatty alcohol, and mixtures thereof. Preferably, the further component is selected from a nucleating agent, a structuring agent, a fatty acid, a fatty alcohol and mixtures thereof.

A nucleating agent may be required to prevent subcooling of the PCM composition. The nucleating agent may be selected from a fatty acid, a fatty alcohol, a fatty amide, a paraffin, a polyether and mixtures thereof. The nucleating agent may be a wax. The nucleating agent may be selected from squalane wax, behenyl behenate, stearic acid, lauric acid, myristic acid, palmitic acid, behenic acid, stearyl alcohol, stearamide, beeswax, montane wax, dicalite, graphite, fumed silica, precipitated silica, potassium dihydrogen phosphate, calcium sulfate and mixtures thereof.

A thermal stabiliser may be required to preventing or retard thermally induced decomposition or isomerization of the PCM composition. In particular, a thermal stabilizer may prevent or retard formation of lower molecular weight products or isomers resulting from thermally induced decomposition or isomerization of the ester. The thermal stabiliser may be selected from phosphites, phosphonites, phosphate esters and mixtures thereof.

An anti-oxidant may be required to prevent or retard oxidation of the PCM composition. In particular, an anti-oxidant may prevent or retard formation of products resulting from reaction of the ester with atmospheric oxygen or with oxygen free radicals, which products may include, for example, alcohols, aldehydes, acids, peroxides, or water. The anti-oxidant may be selected from phenolic antioxidants, sterically hindered phenolic antioxidants, thioether antioxidants, and mixtures thereof.

A fire retardant may be required for fire safety purposes or to conform with fire safety regulations for some uses of the PCM composition. The fire retardant may be selected from a halogenated hydrocarbon, a phosphate ester and mixtures thereof. The fire retardant may be selected from chloroparaffin, bromooctadecane, bromopentadecane, bromononadecane, bromoeicosane, bromodocosane and mixtures thereof. Other possible flame retardants include bis(pentabromophenyl) oxide or bis(tetrabromophenyl) oxide.

A structuring agent may be required to assist in the containment of the PCM composition. The PCM composition may change from solid to liquid and vice versa many times during use, and the structuring agent may add structure the liquid PCM so that it is easier to contain. The structuring agent may be a gellant. The structuring agent may be selected from structuring polymers, gelling polymers, thixotropic polymers and mixtures thereof. The structuring agent may be selected from polyamides, polyurethanes, polyethers, polyacrylates and copolymers and mixtures thereof.

The phase change material composition may comprise at least 0.01 wt % of the further component, preferably at least 0.1 wt %, more preferably at least 1 wt %. The phase change material composition may comprise at most 10 wt % of the further component, preferably at most 5 wt %, more preferably at most 2 wt %, particularly preferably at most 1 wt %. The phase change material composition may comprise in the range from 0.01 to 10 wt % preferably from 0.01 to 5 wt %, more preferably from 0.1 to 5 wt % of the further component. In one embodiment, the PCM composition may consist essentially of the ester of the invention. Preferably, the PCM composition consists of the ester and the further component.

The PCM composition may have a melting point of at least −10° C., preferably at least −5° C., more preferably at least 0° C., particularly preferably at least 5° C. The PCM composition may have a melting point of at most 50° C., preferably at most 40° C., more preferably at most 30° C., yet more preferably at most 25° C., particularly preferably at most 20° C. Preferably, the PCM composition has a melting point in the range from −10° C. to 50° C., more preferably from 5° C. to 25° C. The melting point may be measurable by DSC.

The PCM composition may have a latent heat of fusion (i.e. the latent heat of the transition from solid to liquid) of at least 100 J/g, preferably at least 150 J/g, more preferably at least 160 J/g, yet more preferably at least 170 J/g. The PCM composition may have a latent heat of fusion of at most 300 J/g, preferably at most 250 J/g, more preferably at most 230 J/g, yet more preferably at most 210 J/g. The PCM composition may have a latent heat of fusion in the range from 100 to 250 J/g, preferably in the range from 170 to 210 J/g. The latent heat of fusion may be measurable by DSC.

The PCM composition may have a crystallisation temperature of at least −15° C., preferably at least −10° C., more preferably at least −5° C., yet more preferably at least 0° C. The PCM composition may have a crystallisation temperature of at most 45° C., preferably at most 35° C., more preferably at most 30° C., particularly preferably at most 25° C. Preferably, the PCM composition has a crystallisation temperature in the range from −15° C. to 45° C., more preferably from 0° C. to 25° C. The crystallisation temperature may be measurable by DSC.

The difference between the melting point and the crystallisation temperature of the PCM composition may be less than 10° C., preferably less than 8° C., more preferably less than 6° C.

The volatility and/or vapour pressure of the PCM composition may be indicated by the weight loss of a sample of the PCM composition which is heated at a constant temperature over a period of time. The weight loss may be measurable by TGA. The sample may be placed under nitrogen during the measurement. The PCM composition may have a weight loss after heating at 40° C. for 6 hours of less than 0.8 wt %, preferably less than 0.5 wt %, more preferably less than 0.2 wt %, yet more preferably less than 0.1 wt %, particularly preferably less than 0.05 wt %. The PCM composition may have a weight loss after heating at 40° C. for 6 hours of at least 0.01 wt %.

The PCM composition may have a weight loss after heating at 40 CC for 12 hours of less than 1 wt %, preferably less than 0.8 wt %, more preferably less than 0.5 wt %, yet more preferably less than 0.2 wt %, particularly preferably less than 0.1 wt %. The PCM composition may have a weight loss after heating at 40° C. for 12 hours of at least 0.01 wt %.

PCM Particle

The phase change material composition may be encapsulated, preferably microencapsulated. Various suitable polymeric encapsulation systems produce particles comprising a polymeric shell surrounding a core material. Thus in one embodiment, the present invention provides a phase change material particle comprising a polymeric shell surrounding a core of the phase change material composition of the first aspect of the invention. The PCM particle may be an encapsulated PCM composition. The PCM particle may be a microencapsulated PCM composition. The use of the PCM composition of the invention may mean that the polymeric shell can have a lower permeability than would be required with a comparative PCM due to the lower vapour pressure and/or volatility of the PCM composition of the invention. This may mean that the polymeric shell may have a thinner wall than otherwise required.

The polymeric shell material of the PCM particle may be selected from polyamides, polyamines, polyimides, polyacrylics, polycarbonates, polydienes, polyepoxides, polyesters, polyethers, polyfluorocarbons, formaldehyde polymers, natural polymers, polyolefins, polyphenylenes, silicon containing polymers, polyurethanes, polyvinyls, polyacetals, polyacrylates and copolymers and mixtures thereof.

Preferably the polymeric shell material is a thermoset polymer, because these have good aging stability. For the purposes of the present invention, thermoset polymers are shell materials which do not soften but instead decompose at high temperatures.

Preferably the polymeric shell is selected from formaldehyde resins, polyureas, polyurethanes, polyacrylics, polyacrylates and copolymers and mixtures thereof.

Preferred formaldehyde resins are urea-formaldehyde resins, urea-resorcinol-formaldehyde resins, urea-melamine resins and melamine-formaldehyde resins.

Preference is likewise given to the C1-C4-alkyl ethers, in particular methyl ethers, of these formaldehyde resins and also their mixtures with these formaldehyde resins. Particular preference is given to melamine-formaldehyde resins and/or their methyl ethers. Microencapsulation processes using formaldehyde resins are generally known.

Polymeric shells comprising polyureas and polyurethanes are also suitable. The capsule walls are formed by reaction of reactants bearing NH2 groups or OH groups with diisocyanates and/or polyisocyanates. Examples of suitable isocyanates are ethylene diisocyanate, tetramethylene 1,4-diisocyanate, hexamethylene 1,6-diisocyanate and tolylene 2,4- and 2,6-diisocyanate.

Preference is given to PCM particles (e.g. microcapsules) in which the polymeric shell is a polyacrylic and/or polyacrylate, for example a crosslinked (meth)acrylic ester polymer.

The polymeric shell may be produced by interfacial polymerisation. The polymeric shell may be produced by polymerising one or more monomers selected from (meth)acrylics, (meth)acrylates, vinyl monomers, allyl monomers and mixtures thereof. The monomers may comprise (meth)acrylic acid and/or methyl (meth)acrylate.

PCM Product

In one embodiment, the invention provides a PCM product comprising a container, preferably a sealed container, and a PCM composition of the first aspect of the invention contained within the container. The use of the PCM composition of the invention may mean that the container can have a lower permeability than would be required with a comparative PCM due to the lower vapour pressure and/or volatility of the PCM composition of the invention. This may mean that the container may have a thinner wall than otherwise required (i.e. the container may weigh less) or the container can be made with a different (e.g. cheaper) material or sealing method.

The container may be made of metal or plastic, preferably plastic. The container may be made of a plastic selected from polyamides, polyamines, polyimides, polyacrylics, polycarbonates, polydienes, polyepoxides, polyesters, polyethers, polyfluorocarbons, formaldehyde polymers, natural polymers, polyolefins, fluorinated polyolefins, polyphenylenes, silicon containing polymers, polyurethanes, polyvinyls, polyacetals, polyacrylates and copolymers and mixtures thereof. Preferably the plastic is selected from polyolefins, polyvinyls, polyesters and co-polymers and mixtures thereof. The container may be made of a metal selected from steel, aluminium, titanium, magnesium and alloys thereof, preferably the metal is selected from aluminium and alloys thereof.

The container may be rigid or flexible. The container may be selected from a tube, a rod, a pouch or a panel, preferably a pouch or a panel. Preferably the container is a flexible pouch. The container may be a rigid panel.

The PCM product may be incorporated in a textile product (e.g. an article of clothing), foam product (e.g. a mattress), medical product (e.g. a container for human or animal tissue), electronic product (e.g. a printed circuit board or battery) refrigeration system (e.g. a refrigerator or freezer), heating, ventilation and air-conditioning (HVAC) system, packaging material or construction material. The PCM product may be used in the temperature regulation of a human or animal body or part thereof.

In one embodiment, the invention provides a textile product, foam product, medical product, electronic product, refrigeration system, HVAC system, packaging material or construction material comprising the PCM composition of the first aspect of the invention. The PCM composition may be incorporated in a PCM product or a PCM particle as described herein.

Method of Regulating Temperature

Viewed from the second aspect, the present invention provides a method of regulating temperature in an environment comprising the steps of: providing in the environment an amount of a phase change material composition comprising an ester of a linear alcohol which has at least 4 carbon atoms and a linear carboxylic acid which has at least 4 carbon atoms, wherein the total number of carbon atoms in the ester is in the range from 13 to 31; and storing or releasing thermal energy in the phase change material composition by transfer of thermal energy between the environment and the phase change material composition, such that the temperature of the environment is regulated over a period of time.

The period of time may be at least 1 minute, preferably at least 15 minutes, more preferably at least 30 minutes, yet more preferably at least 1 hour. The period of time may be at most 7 days, preferably at most 3 days, more preferably at most 24 hours, yet more preferably at most 12 hours.

The transfer of thermal energy between the environment and the phase change material composition may be used in the temperature regulation of a heat or cold sensitive material located within the environment. The heat or cold sensitive material may be selected from a part of a human or animal body (either as a living body or as tissue e.g. an organ for transplant), a plant, a food, a drink, a medicine or an electronic circuit. Preferably the heat or cold sensitive material is part of a human or animal body.

Use of the Ester as a PCM

Viewed from the third aspect, the invention provides the use of an ester of a linear alcohol which has at least 4 carbon atoms and a linear carboxylic acid which has at least 4 carbon atoms, wherein the total number of carbon atoms in the ester is in the range from 13 to 31 as a phase change material in a textile product, foam product, medical product, electronic product, refrigeration system, HVAC system, packaging material or construction material. Preferably the use is in a textile product, foam product or packaging material, more preferably in a textile product or a foam product.

Preferably the ester is incorporated in a PCM composition of the first aspect of the invention.

Any or all of the disclosed features, and/or any or all of the steps of any method or process described herein, may be used in any aspect of the invention.

EXAMPLES

The invention is illustrated by the following non-limiting examples.

It will be understood that all test procedures and physical parameters described herein have been determined at atmospheric pressure and room temperature (i.e. about 20° C.), unless otherwise stated herein, or unless otherwise stated in the referenced test methods and procedures. All parts and percentages are given by weight unless otherwise stated.

Test Methods

In this specification, the following test methods have been used:

(i) Differential Scanning calorimetry (DSC) was performed using a Mettler-Toledo machine (module DSC822-LT) and the control and analysis software provided by Mettler-Toledo.

(ii) Thermo-gravimetric analysis (TGA) was performed using a Mettler-Toledo machine (module TGA/SDTA851) and the control and analysis software provided by Mettler-Toledo.

(iii) The acid value is defined as the number of mg of potassium hydroxide required to neutralise the free acid in 1 g of sample, and was measured by direct titration with a standard potassium hydroxide solution.

Materials Used

Materials used in the following Examples are identified as follows:

Decyl alcohol
Lauryl alcohol
Cetyl alcohol
Nonanoic acid
Ethyl myristate
Hexadecane
Iso-pentadecane
Parafol 16-97™—ex Sasol—comprising a minimum of 97 wt % n-hexadecane Example 1

A lauryl nonanoate ester for use in a phase change material composition of the invention is synthesised as follows. 198.60 g of lauryl alcohol and 190.01 g of nonanoic acid are weighed in a glass vessel equipped with condenser. The mixture is heated to reaction temperature (225° C.) and reaction water condensed. A packed column is used to prevent losses via the condenser. The reaction is continued until the acid value <18 mg KOH/g. The excess of acid is stripped by applying vacuum to the reaction set-up and heating it to distillation temperature (at 5 mbar approx. 180° C.) until an acid value <12 mg KOH/g is reached. When the acid is distilled, nitrogen is purged to release the vacuum and the product (lauryl nonanoate) is cooled. The ester may also be prepared with an excess of alcohol and then stripping of the excess alcohol.

Example 2

Decyl nonanoate and cetyl nonanoate esters were prepared using decyl alcohol and cetyl alcohol instead of lauryl alcohol using a method similar to Example 1.

Example 3

The esters of Examples 1 and 2 were analysed by Differential Scanning calorimetry (DSC) using a Mettler-Toledo DSC 822 machine and the control and analysis software provided by Mettler-Toledo as follows:

Module: DSC822-LT, 26.05.2010 13:28:24
Evaluation: STAR-e software version 10.00

The DSC-scans for decyl- and lauryl-nonanoate consist of a cooling and heating segment through the phase change from liquid to solid vice versa at a rate of 1° C./min for the actual determination of latent heat and phase change temperature. The DSC-scan for cetyl nonanoate consists of a primary heating segment at a rate of 5° C./min to melt the ester, followed by a cooling and heating segment through the phase change from liquid to solid vice versa at a rate of 1° C./min for the actual determination of latent heat and phase change temperature. The results of the DSC tests are given in Table 1 below.

Table 1 also includes DSC data for the comparative samples: ethyl myristate, Parafol 16-97 (comprising a minimum of 97 wt % n-hexadecane) and a mixture of n-Hexadecane and iso-Pentadecane.

TABLE 1

| Sample | Total Carbon atoms | Melting point [° C.] | Latent heat of fusion [J/g] | Crystallization temperature [° C.] | Latent heat of crystallisation [J/g] |
|---|---|---|---|---|---|
| Decyl nonanoate | 19 | 6.8 | 175.4 | 2.7 | −174.6 |
| Lauryl nonanoate | 21 | 15.0 | 187.4 | 9.7 | −185.0 |
| Cetyl Nonanoate | 25 | 24.7 | 193.2 | 22.1 | −190.0 |
| Ethyl myristate (comparative) | 16 | 14.0 | 187.7 | 5.65 | −187 |
| Parafol 16-97 (comparative) | 16 | 18.5 | 225.3 | 16.9 | −229.1 |
| Mixture 92% n-Hexadecane plus 7% iso-Pentadecane (comparative) | 16/15 | 17.3 | 196.0 | 14.8 | −197.6 |

It can be seen from Table 1 that the melting points of the C16 hydrocarbon comparative samples are around 17-18° C. and the melting point of the C16 comparative ester (ethyl myristate) is 14° C. These melting points are close to the C21 ester of the invention (lauryl nonanoate) which has a melting point of 15° C. but has 5 extra carbon atoms in total. Without being bound by theory, it is believed that the ester bond being in the middle region of the C21 lauryl nonanoate ester means its melting point is reduced so that it is comparable with the melting point of the C16 comparative ester which uses an ethyl alcohol and therefore an ester bond towards the end of the molecule.

Example 4

A selection of the samples of Table 1 were analysed by Thermo-Gravimetric Analysis (TGA) using a Mettler-Toledo TGA/SDTA851 machine and the control and analysis software provided by Mettler-Toledo as follows.

For the 6 hour test:
Method: isoT40_6h_T=40_N2=30
dt 30.00 s
[1] 40.0° C., 360.00 min, N2 30.0 ml/min
Synchronization enabled
Module: TGA/SDTA851, 26.05.2010 13:32:22
For the 12 hour test:
Method: isoT40_12h_T=40_N2=30
dt 30.00 s
[1] 40.0° C., 720.00 min, N2 30.0 ml/min
Synchronization enabled
Module: TGA/SDTA851, 26.05.2010 13:32:22

The samples were heated at 40° C. for 12 hours under nitrogen and the weight loss of the samples was measured at 6 hours and 12 hours. The results are given in Table 2.

TABLE 2

| Sample | Weight loss at 40° C. after 6 h [wt %] | Weight loss at 40° C. after 12 h [wt %] |
| --- | --- | --- |
| Lauryl nonanoate | 0.045 | 0.055 |
| Ethyl myristate (comparative) | 0.29 | No data |
| Parafol 16-97 (comparative) | 0.92 | 1.68 |
| Mixture 92% n-Hexadecane plus 7% iso-Pentadecane (comparative) | 1.15 | No data |

It can be seen from Table 2 that lauryl nonanoate has significantly lower weight loss over 6 and 12 hours than all the comparative samples. The hydrocarbon samples lose most weight i.e. have the highest evaporation rate and are therefore the most volatile. Ethyl myristate has less weight loss than the hydrocarbons but still much more than lauryl nonanoate. Without being bound by theory, it is believed that the 5 extra carbons atoms in total in lauryl nonanoate contribute to its lower rate of evaporation when compared with the comparative PCM samples having a similar melting point.

After 12 hours, lauryl nonanoate still has lower weight loss than ethyl myristate after 6 hours.

It is to be understood that the invention is not to be limited to the details of the above embodiments, which are described by way of example only. Many variations are possible.

The invention claimed is:

1. A method of regulating temperature in an environment comprising the steps of:
providing in the environment an amount of a phase change material composition comprising an ester of a linear alcohol which has at least 4 carbon atoms and a linear carboxylic acid which has 7 or 9 carbon atoms, wherein the total number of carbon atoms in the ester is in the range from 13 to 31; and
storing or releasing thermal energy in the phase change material composition by transfer of thermal energy between the environment and the phase change material composition, such that the temperature of the environment is regulated over a period of time.

2. The method according to claim 1, wherein the transfer of thermal energy between the environment and the phase change material composition is used in the temperature regulation of a heat or cold sensitive material located within the environment.

3. The method according to claim 2, wherein the heat or cold sensitive material is part of a human or animal body.

4. The method according to claim 2, wherein the heat or cold sensitive material is an electric circuit.

5. The method according to claim 1, wherein the alcohol and the acid have a different number of carbon atoms.

6. The method according to claim 1, wherein the alcohol has from 6 to 22 carbon atoms.

7. The method according to claim 1, wherein the alcohol is selected from decyl alcohol, lauryl alcohol, myristyl alcohol, cetyl alcohol and mixtures thereof.

8. The method according to claim 1, wherein the ester comprises lauryl nonanoate.

9. The method according to claim 1, wherein the phase change material composition further comprises a further component selected from a nucleating agent, a thermal stabiliser, an anti-oxidant, a fire retardant, a structuring agent, a fatty acid, a fatty alcohol, and mixtures thereof.

10. The method according to claim 9, wherein the further component is selected from a nucleating agent, a structuring agent, a fatty acid, a fatty alcohol and mixtures thereof.

11. The method according to claim 1, wherein the ester has a melting point which is at least 2° C. lower than a comparative ester with the same total number of carbon atoms wherein the comparative ester is a methyl or ethyl ester of a linear carboxylic acid.

12. The method according to claim 1, wherein the ester is encapsulated.

13. The method according to claim 1, wherein the ester is microencapsulated.

14. The method according to claim 1, wherein the period of time is at least one minute.

15. The method according to claim 1, wherein the period of time is at least 15 minutes.

16. The method according to claim 1, wherein the period of time is at least 30 minutes.

17. The method according to claim 1, wherein the period of time is at least 1 hour.

18. The method according to claim 1, wherein the period of time is at most 7 days.

19. The method according to claim 1, wherein the period of time is at most 3 days.

20. The method according to claim 1, wherein the period of time is at most 24 hours.

21. The method according to claim 1, wherein the period of time is at most 12 hours.

* * * * *